HYDRAULIC APPARATUS FOR LOCKING A SIDE SHIFTABLE EXCAVATOR

Original Filed April 22, 1965 2 Sheets-Sheet 1

Inventor.
ELTON B. LONG
BY
Wilson, Settle & McKinnon
ATTORNEYS

HYDRAULIC APPARATUS FOR LOCKING A SIDE SHIFTABLE EXCAVATOR

Original Filed April 22, 1965 2 Sheets-Sheet 2

Inventor.
ELTON B. LONG
BY
Wilson, Settle & McKinnon
ATTORNEYS

United States Patent Office

Re. 26,439
Reissued Aug. 13, 1968

26,439

HYDRAULIC APPARATUS FOR LOCKING A SIDE SHIFTABLE EXCAVATOR

Elton B. Long, Burlington, Iowa, assignor to J. I. Case Company, Racine, Wis., a corporation of Wisconsin Original No. 3,304,100, dated Feb. 14, 1967, Ser. No. 450,114, Apr. 22, 1965. Application for reissue Jan. 4, 1968, Ser. No. 698,068
3 Claims. (Cl. 280—456)

Matter enclosed in heavy brackets [ ] appears in the original patent but forms no part of this reissue specification; matter printed in italics indicates the additions made by reissue.

*ABSTRACT OF THE DISCLOSURE*

*A side shiftable backhoe having a fixed frame defining vertically spaced rails each having opposed vertical bearing surfaces and a mobile frame supported by said rails. The mobile frame is supported on the upper surface of the upper rail and includes first and second groups of engaging means for respectively engaging the opposed vertical bearing surfaces of the respective rails. One group of engaging means is hydraulically movable to clamp the respective rails between cooperating engaging means.*

*Background of the invention*

The present invention relates generally to a side shiftable excavator, such as a backhoe, and more particularly to a novel system, including appartaus, for hydraulically locking a side shiftable or mobile frame which carries an earth working implement, such as a backhoe assembly, in any one of an infinite number of positions along a fixed and immobile frame which is carried by the tractor chassis. This inventive system hydraulically locks the mobile frame to the immobile frame without requiring exact, precise tolerance adherence and component alignment between the frames and is easily hydraulically locked and unlocked for more rapid repositioning of the mobile frame and the implement without requiring that the excavator operator leave his seat.

In the past, it has been common commercial practice in the excavating art to mechanically lock the mobile frame of an excavator, such as a backhoe, to an immobile frame. Such mechanical locks, previously used, include frame connections such as: (1) a fixed number of aperture positions in the immobile frame and through one of which a bolt assembly is to extend, which bolt assembly may be tightened mechanically to secure the mobile frame in a desired position (for example, see United States Patent 3,139,199) and (2) a pair of horizontal slots positioned at different elevations in the mobile frame and through which passes one or more bolts, which bolts are also attached to the mobile frame and may be mechanically tightened to lock the mobile frame in the desired position (for example, see United States Patent 3,156,488).

Such mechanical locks are objectionable since repositioning of the mobile frame is costly, time consuming, and annoying, requiring that the operator dismount the excavator, mechanically loosen the lock by use of a wrench or the like, remount the excavator, re-situate the mobile frame in the desired new position with respect to the immobile frame by use, for example, of the bucket and crowd cylinder, again dismount the excavator, mechanically tighten the lock by use of the wrench or the like, and again remount the tractor for further excavation. Furthermore, such mechanical locks tend to loosen during excavation, requiring expenditure of further excessive time and attention. These mechanical locks also often encounter mechanical interference which makes locking impossible or extremely difficult due to component misalignment (such as misalignment of matching apertures in the mobile and immobile frames) resulting from wear, abuse and the like. In addition, the versatility of the prior art excavators of the side shiftable type have been limited since almost all of such mechanical locking devices have only a fixed number (such as 4, 6, 8 etc.) of positions in which the mobile frame may be locked.

Therefore, it would be a valuable contribution to the side shiftable excavating art to provide a system for hydraulically locking the mobile frame in any one of an infinite number of positions along the immobile frame, which hydraulic lock does not tend to loosen during excavation, does not necessitate precise alignment between the frames to avoid mechanical interference and does not require that the operator dismount from the excavator to unlock, to lock or to reposition the mobile frame.

This invention provides such a system. Generally, the presently preferred embodiment of this invention structurally includes upper and lower generally horizontally disposed slide rails integrally carried by the immobile frame. The swing post of the excavator is mounted on a vertically extending side shiftable or mobile frame which spans the distance between the two slide rails. This mobile frame is rectangular in outline and considerably smaller than the mobile frame. The mobile frame (which also carries the backhoe operator seat) is slidable on the immobile frame along the slide rails and is provided with a top slide rail guide projecting from the mobile frame toward the tractor and being engageable at times with the top, the bottom and both sides of the top slide rail. The mobile frame also carries a bottom slide rail guide which is engageable with both sides of the bottom slide rail. This slide rail and guide arrangement is more fully disclosed in co-pending application Serial No. 449,966 filed on even date herewith and assigned to the assignee of the present invention. The slide rail and guide arrangement per se, therefore, constitutes no part of the present invention.

The mobile frame may be locked in position at a selected location along the immobile frame by means of four hydraulic cylinders carried by the mobile frame at the respective corners thereof. The cylinders are jointly actuatable forwardly (i.e. toward the tractor) to project the cylinder piston rods carrying pressure bearing surfaces into pressurized frictional engagement with the rearwardly facing surfaces of both slide rails. Actuation of the hydraulic cylinders also displaces the mobile frame a slight distance away from the tractor chassis transverse to the length of the slide rails causing back-up pressure bearing surfaces which are directly mounted upon the mobile frame to pressurizingly engage the front facing surfaces of both slide rails. Thus, the mobile frame may be hydraulically locked in one of an infinite number of positions by pressurized frictional force exerted along both sides of both slide rails without requiring the operator to leave his seat. No exact alignment of the bearing surfaces and the slide rails is needed. Subsequently, retraction of the hydraulic pistons followed by use of the crowd cylinder and the bucket of the backhoe assembly will accommodate easy relocation of the mobile frame, after which the hydraulic cylinders may again be used in the manner previously described to lock the mobile frame in position.

Accordingly, it is a primary object of this invention to provide, in a side shiftable excavator, a novel apparatus for hydraulically locking the mobile frame in any one of an infinite number of positions along the immobile frame.

Another object is the provision, in a side shiftable excavator of a system including apparatus, for hydraulically locking the mobile frame in a desired position without necessitating essentially accurate alignment between the mobile frame and the immobile frame.

A further object is the provision in a side shiftable excavator of a system including apparatus for rapidly hydraulically locking the mobile frame in a desired position which eliminates the need for the operator to leave his seat upon the excavator in order to so reposition the mobile frame.

These and other objects and features of this invention will become more fully apparent from the following description and appended claims in conjunction with the accompanying drawings wherein:

General

Reference is now made to the drawings wherein like numerals are used to designate like parts throughout.

Figure 1:
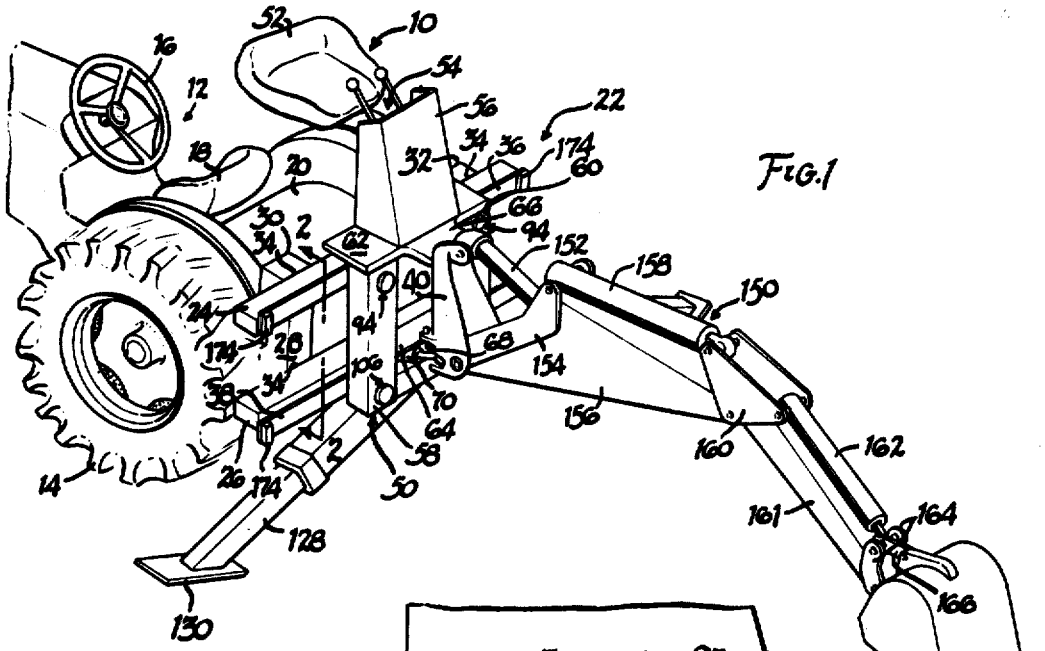
FIGURE 1 is a perspective view of a tractor mounted side shiftable backhoe equipped with the novel hydraulic locking system of this invention.

FIGURE 1 illustrates, in perspective, a tractor-mount backhoe generally designated 10, which comprises a tractor 12 having rubber tires 14, a steering wheel 16, a driver's seat 18 and a chassis 20. The tractor 12, of course, is only representative of one of several types of tractors which could be utilized in conjunction with the present invention. Naturally, track-mounted tractors are also encompassed by the present invention.

Generally, the embodiment depicted in the drawings structurally includes a fixed or immobile frame, generally designated 22, which is integrally fastened to the tractor chassis 20 by forwardly projecting ears (not shown) or the like carried by the immobile frame 22 and secured to attachment arms (not shown) on the tractor chassis 20.

A side shift or mobile frame 50 is carried by the immobile frame 22. A swing post 40 is pivotably supported by the mobile frame 50 and carries, in a conventional manner, a backhoe assembly 150 which comprises a boom cylinder 152, an anchor bracket 154 and a boom 156, a dipper stick or crowd cylinder 158, a triangularly shaped pivotable bracket 160, a dipper stick 161, a bucket cylinder 162, links 164 and 166 and a bucket 168. The backhoe assembly 150 per se constitutes part of the prior art.

The immobile frame

The immobile frame 22 along with the general manner in which the mobile frame 50 is carried in a slide rail and slide rail guide arrangement by the immobile frame 22 constitutes part of the invention of co-pending application Serial No. 449,966, filed on even date herewith and assigned to the assignee of the present invention. The immobile frame 22 comprises two generally horizontally extending beams 24 and 26, of hollow rectangular cross sectional configuration, which are joined by welding or the like to the rear side 28 of a pair of transversely spaced, vertically extending columns 30 and 32, also preferably of hollow rectangular cross sectional configuration. The welds so joining the beams 24 and 26 to the columns 30 and 32 are identified by the numerals 34. The upper beam 24 is further supported by a pair of diagonally disposed braces 25, fabricated preferably from hollow rectangular cross sectional stock, which are welded or otherwise secured to the faces 28 of the columns 30 and 32 at 61 and to the beam 24 at 63.

The rear faces of each of the beams 24 and 26 carry vertically disposed plates 36 and 38, preferably of solid rectangular cross section. These plates 36 and 38 constitute slide rails and are preferably welded or otherwise integrally secured at the rear faces of the beams 24 and 26. The slide rails 36 and 38, as can be seen by inspection of the figures, are vertically aligned with each other at different elevations and extend generally horizontally, with the top slide rail 36 projecting above the beam 24 and the bottom slide rail 38 projecting beneath the beam 26.

Integrally attatched to the lower beam 26, as by welding, are three members including an angularly-shaped member 120, a horizontally disposed plate 122 and a vertically disposed plate 124. In combination, the angle 120 and the plates 122 and 124 constitute a bracket generally designated 126. The bracket 126 supports the stabilizer or outrigger legs 128 (FIGURE 1), each of which have a ground engaging pedestal 130. The stabilizer legs 128 (one of which is illustrated in FIGURE 1) are pivotably mounted to the downwardly extending portion of the angularly-shaped member 120 and to the vertically disposed plate 124 by means of a pin and aperture assembly (not shown).

The mobile frame

The swing post 40 of the overall excavator 10 is mounted on the generally vertically extending side shiftable or mobile frame 50, as previously stated. The mobile frame 50 spans the distance between the slide rails 36 and 38. This mobile frame is rectangular in outline and considerably smaller than the immobile frame 22. The mobile frame 50 carries with it an excavator operator's seat 52 and a control panel 54 having a cover 56. The mobile frame 50 is slidable, under certain conditions, along the previous described slide rails 36 and 38 of the immobile frame 22.

The mobile frame 50 structurally comprises a pair of vertically extending columns 58 and 60 integrally connected to a top plate 62 (which carries the control panel 54 and the cover 56) and to a bottom support plate 64. The top support plate 62 and the bottom support plate 64 each have an integral ear 66 and 68, respectively, upon which the swing post 40 is pivotally mounted by connecting pins (hidden from view). The swing post 40 is hydraulically rotatable responsive to actuation of a pair of swing cylinders, only one of which is illustrated in the figures, being identified by the numeral 70.

The mobile frame 50 is slidably carried by the immobile frame 22 along the two slide rails 36 and 38 and is provided with two top slide rail guides, generally designated 72, and two bottom slide rail guides, generally designated 74. The upper slide rail 36 and the two guides 72, in combination, constitute primary load-carrying members in that the downward vertical load imposed upon the immobile frame 22 by the backhoe assembly 150 and by the mobile frame 50 is transmitted through the plate 62 solely to the top surface 76 of the slide rail 36. No downward vertical load is transmitted to the lower slide rail 38.

Each upper slide rail guide 72 comprises a back-up stop block 78 integrally secured to the top plate 62 as by welding, a bottom stop block 80 integrally secured to the columns 58 and 60 of the mobile frame 50 at 84 (which contacts the bottom 86 of the upper slide rail 36 to transmit any upward thrust generated during excavation and the like), and a pressure bearing pad or ram 88 providing a pressure bearing surface 90. The pressure bearing pad or ram 88 is integrally connected to a piston 92 which is reciprocably carried within a casing 93 of a cylinder assembly 94. Each of the two cylinder assemblies 94 is illustrated as being a one way cylinder and is in fluid communication with the hydraulic system (not shown) of the tractor 12 through the port 95.

Each lower slide rail guide 74 comprises a back-up stop member 96 providing a pressure bearing surface 98 (the back-up stop 96 being integrally attached at the bottom to the columns 58 and 60) and a pressure bearing pad or ram 100 providing a pressure bearing surface 102 (the pressure bearing pad or ram 100 being integrally attached to a piston 104 reciprocally disposed within a casing 105 of a cylinder assembly 106). The rear of each of the two cylinder casings 105 is in fluid communication with the hydraulic system (not shown) of the tractor 12 through a port 107.

Figure 3:
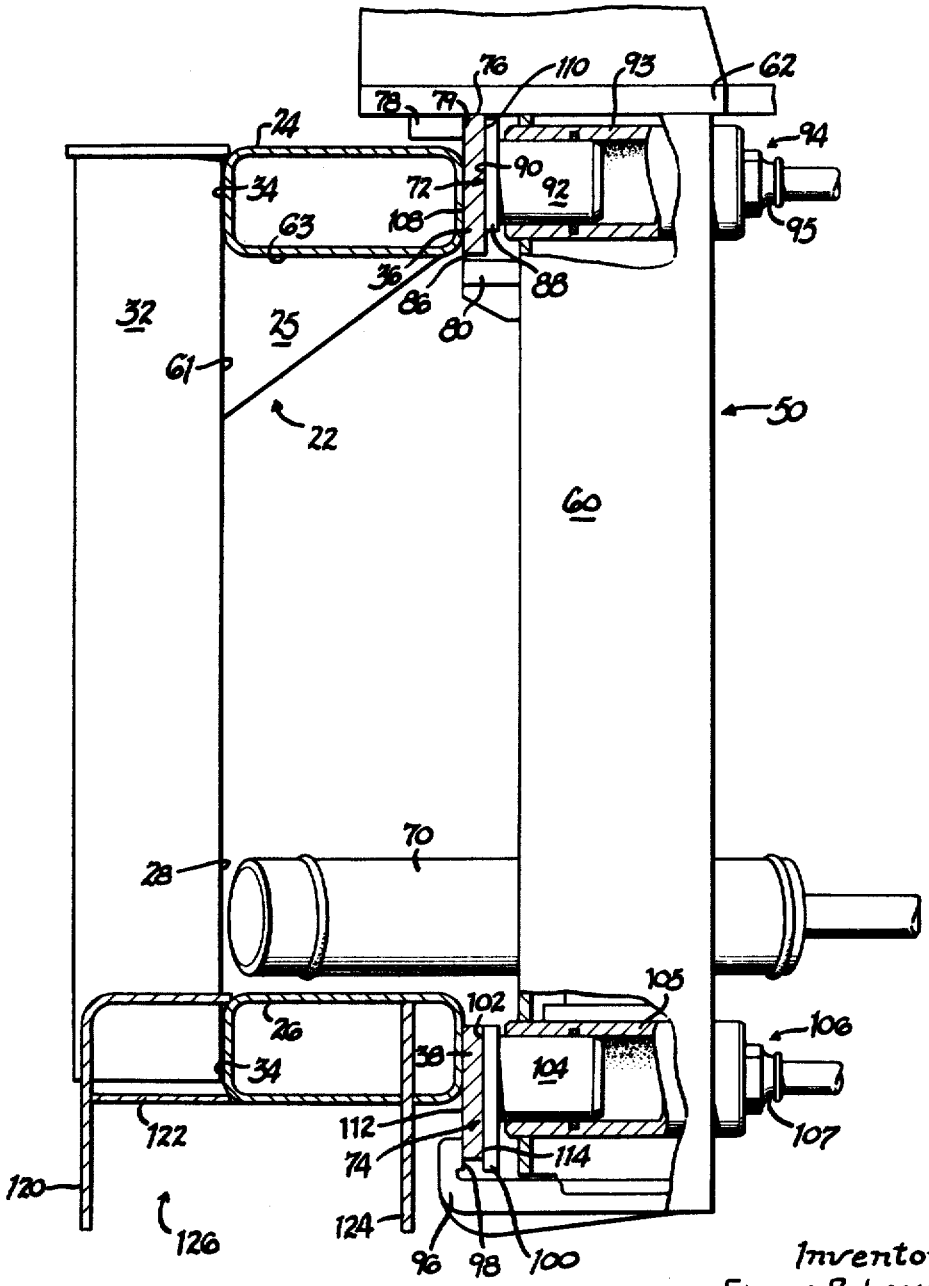
FIGURE 3 is a cross sectional view similar to FIGURE 2 illustrating the novel hydraulic lock mechanism of this invention in its retracted locked or closed position.

Thus, when the mobile frame 50 is locked in a predetermined position along the slide rails 36 and 38 of the immobile frame 22 as depicted in FIGURE 3 (by reason of extension of the pistons 92 and 104 of the cylinder assemblies 94 and 106, respectively, through introduction of hydraulic fluid through the ports 95 and 107), the top slide rail 36 and the two top guides 72 as well as the bottom slide rail 38 and the two bottom guides 74 each in combination constitute anti-rotate assemblies. These anti-rotate assemblies receive the previously described overturning moment caused by the cantilevered suspension of the backhoe assembly 150. Assumption of this overturning moment by the immobile frame 22 is achieved by (1) pressurized engagement between the face 79 of each back-up stop 78 and the side surface 108 of the slide rail 36 and the pressurized engagement of the pressure bearing surface 90 of each pad or ram 88 with the side surface 110 of the slide rail 36, and (2) pressurized engagement of the pressure bearing surface 98 of each back-up pad 96 against the side surface 112 of the bottom slide rail 38 and pressurized engagement between the pressure bearing surface 102 of each pad or ram 100 with the side surface 114 of the slide rail 38, all responsive to extension of the two top pistons 92 and the two bottom pistons 104. As seen in FIGURE 1, one of the top cylinder assemblies 94 and one of the bottom cylinder assemblies 106 are, respectively, attached to each of the vertically extending columns 58 of the mobile frame 50 in any desired manner as, for example, by welding. Thus, by use of the four cylinder assemblies 94 and 106, the mobile frame 50 may be positioned in any one of an infinite number of positions along the immobile frame 22 so that the mobile frame does not tend to loosen during excavation and without necessitating that precise alignment between the two frames be provided in order to avoid mechanical interference. Significantly, the hydraulic locking mechanism of this application allows the operator to unlock, reposition and then relock the mobile frame in any desired position along the immobile frame without necessitating that the operator leave his seat and dismount the excavator.

Operation

The mobile frame 50 may be locked in any desired position at a selected location along the immobile frame 22 by use of the four hydraulic cylinders 94 and 106 which are carried by the mobile frame 50 at the respective corners thereof. Briefly, to reposition the mobile frame 50, the pistons 92 and 104 of the cylinder assembly 94 and 106, respectively, are jointly retracted by exhausting hydraulic fluid from the rear of the cylinder assemblies through the ports 95 and 107. This joint retraction moves the pressure bearing surfaces 90 and 102 of the rams or pressure bearing pads 88 and 100 out of pressurized engagement with the sides 110 and 114 of the slide rails 36 and 38, respectively. i.e. from the position of FIGURE 3 to that of FIGURE 2. As can be appreciated by inspection of FIGURES 2 and 3, retraction of these pistons accommodates a slight shifting of the mobile frame axially of the tractor toward the tractor causing the back-up stop 78 to be relieved from pressurized engagement at 79 with the side 108 of the slide rail 36 and the surface 98 of the back-up pad 96 to be relieved out of pressurized frictional engagement with the surface 112 with the bottom slide rail 38. This position is schematically and somewhat ideally illustrated in FIGURE 2.

Figure 2:
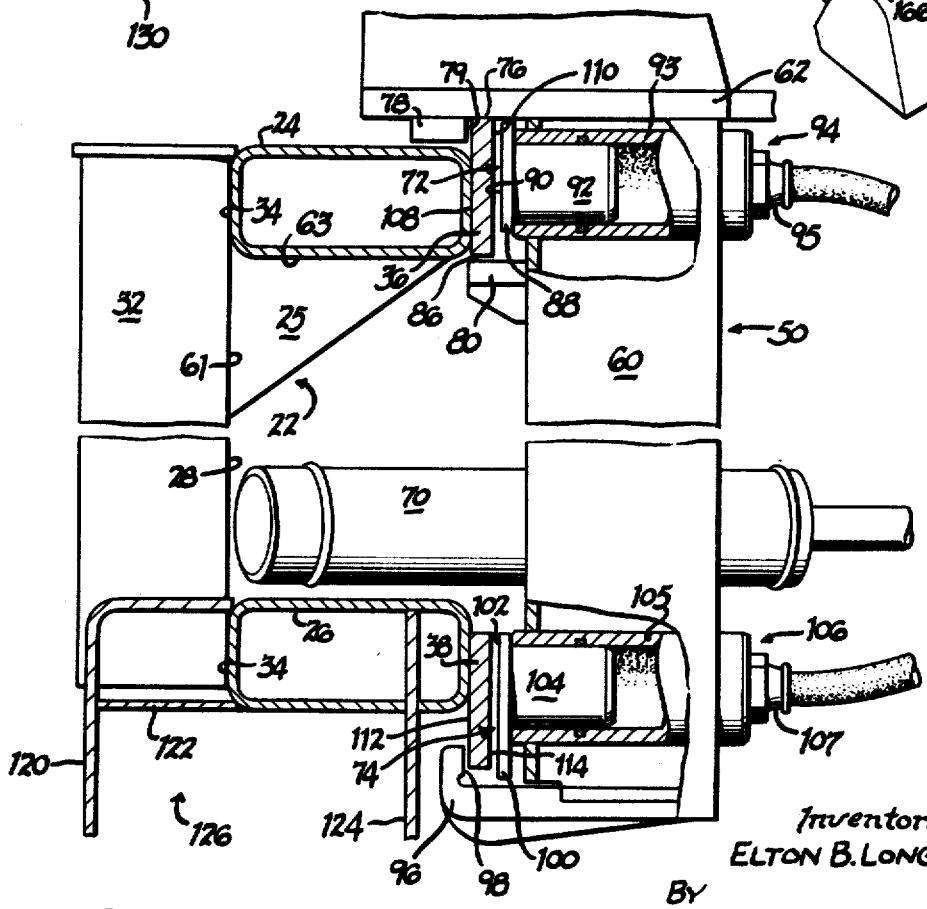
FIGURE 2 is a cross sectional view taken along 2—2 of FIGURE 1 illustrating the novel hydraulic locking mechanism of this invention in the open or unlocked position.

Of course, although not shown in FIGURE 2, some slide contact between the surface 108 of the slide rails 36 and the surface 79 of the stop 78 as well as between the surface 102 of the ram 100 and the surface 114 of the slide rail 38 will still remain as a result of the transmitted overturning moment caused by the cantilevered suspension of the backhoe assembly 150, which moment is transmitted from the mobile frame 50 to the immobile frame 22 even when the overall apparatus 10 is idle. By use of the crowd cylinder 162 and the bucket 168 of the backhoe assembly 150, easy relocation of the mobile frame 50 with respect to the immobile frame 22 may be accommodated in a well known manner.

When the mobile frame 50 has been located in the desired new position, the four cylinder assemblies 94 and 106 are jointly actuated by introduction of hydraulic fluid under pressure through the ports 95 and 107 into the rear of the cylinders to extend the pistons 92 and 104. This projects the rams 88 and 100 at surfaces 90 and 102 into pressurized frictional engagement with the slide rail surfaces 110 and 114, respectively. Actuation of the hydraulic cylinders 94 and 106 to extend the pistons 92 and 104, respectively, also displaces the mobile frame 50 a slight distance away from the tractor chassis 20 transverse to the length of the slide rails 36 and 38. This forces the back-up pressure bearing surface 98 of the back-up pad 96 and the surface 79 of the stop 78 into pressurized frictional engagement with the front facing surfaces 108 and 112, respectively, of the slide rails.

Thus, the mobile frame 50 may be hydraulically locked in any one of an infinite number of positions by pressurized frictional force exerted solely along each side of both slide rails without requiring the operator to leave his seat and dismount the excavator. No exact alignment of the pressure bearing surfaces of the slide rail guides and the slide rail is needed either initially or after significant wear and abuse has been imposed upon the excavator 10.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

[1. In an excavating device having a side shiftable frame slidably carried by use of slide rail guides along at least upper and lower slide rails of a stationary frame, the improvement comprising means for hydraulically locking the side shiftable frame in any one of an infinite number of positions along the stationary frame including at least one hydraulic cylinder having a ram at the distal end of the piston accommodating surface-to-surface pressurized engagement between the ram and stationary frame so that the side shiftable frame may be rapidly relocated with respect to the stationary frame in any desired position merely by hydraulic actuation without requiring the operator of the excavating device to leave his seat and dismount the excavating device.]

[2. In an excavating device having a side shiftable frame slidably carried by use of slide rail guides along at least upper and lower slide rails of the stationary frame, the improvement comprising means carried by the side shiftable frame for hydraulically locking the side shiftable frame in any one of an infinite number of positions along the stationary frame including at least one hydraulic cylinder having a ram at the distal end of the piston accommodating surface-to-surface pressure engagement between the ram and at least one of said slide rails, and at least one back-up pad carried by the side shiftable frame accommodating pressure engagement with the side shiftable frame when the side shiftable frame is locked in position relative to the stationary frame whereby the side shiftable frame may be rapidly relocated with respect to the stationary frame in any desired position merely by hydraulic actuation without requiring the operator to leave his seat upon the excavating device.]

3. In an excavating device having a side shiftable frame slidably carried by use of slide rail guides along at least upper and lower slide rails of a stationary frame, the improvements comprising hydraulic locking means carried by the side shiftable frame to hydraulically lock the side shiftable frame in contiguous pressurized frictional abutting relation with the stationary frame in any one of an infinite number of positions along the stationary frame including a plurality of hydraulic cylinders each having a bearing surface at the distal end of the piston rod, said bearing surfaces being engageable in surface-to-surface pressurized frictional abutting relation with the side surface remote from the stationary frame of both slide rails, and a plurality of back-up pads carried by the side shiftable frame and displaceable into and out of pressurized frictional engagement with the side surface most adjacent to the stationary frame of both slide rails responsive to energizing and de-energizing of the hydraulic cylinders.

*4. In a side shiftable excavator having a stationary frame including upper and lower slide rails each defining first and second substantially vertical bearing surfaces and a mobile frame supported on one of said rails, the improvement comprising engaging means carried by said mobile frame for engaging said first bearing surfaces, hydraulic lock means carried by said mobile frame for locking said mobile frame in any one of an infinite number of positions along the stationary frame, said hydraulic lock means comprising at least two hydraulic cylinders fixedly secured to said mobile frame and piston rods respectively slidably received in each of said cylinders, said piston rods each having a rod bearing surface at the distal end thereof, said rod bearing surfaces respectively engaging said second bearing surfaces of said rails whereby pressurization of said cylinder will clamp said rails between said engaging means and said rod bearing surfaces to lock said mobile frame on said stationary frame.*

*5. A side shiftable excavator as defined in claim 4, in which said hydraulic locking means includes four hydraulic cylinders each slidably receiving a piston rod with a rod bearing surface on the distal end of each piston rod, two of said rod bearing surfaces being horizontally spaced on said mobile frame and aligned with the second bearing surface of said upper rail and the remaining two of said rod bearing surfaces being horizontally spaced and aligned with the second bearing surface of said lower rail.*

References Cited

The following references, cited by the Examiner, are of record in the patented file of this patent or the original patent.

UNITED STATES PATENTS

| | | | |
|---|---|---|---|
| 3,036,845 | 5/1962 | Till | 280—432 |
| 3,155,250 | 11/1964 | French et al. | 214—138 |

FOREIGN PATENTS

| | | |
|---|---|---|
| 1,169,734 | 9/1958 | France. |
| 1,330,860 | 5/1963 | France. |
| 972,208 | 10/1964 | Great Britain. |
| 975,029 | 11/1964 | Great Britain. |
| 984,383 | 2/1965 | Great Britain. |

LEO FRIAGLIA, *Primary Examiner.*